United States Patent Office 3,531,469
Patented Sept. 29, 1970

3,531,469
DERIVATIVES OF PENICILLANIC ACID
Peter Bamberg, Enhorna, and Bertil Åke Ekström and Berndt Olof Harald Sjöberg, Sodertalje, Sweden, assignors to Aktiebolaget Astra, Sodertalje, Sweden, a company of Sweden
No Drawing. Continuation-in-part of application Ser. No. 640,835, May 24, 1967. This application Dec. 18, 1968, Ser. No. 784,912
Claims priority, application Great Britain, June 3, 1966, 24,900/66
Int. Cl. C07d 99/16
U.S. Cl. 260—239.1
8 Claims

ABSTRACT OF THE DISCLOSURE

Penicillins containing a quinolymethyl radical in the side chain and a process for preparing them, said penicillins having effectiveness as antibacterial agents, nutritional supplements for animals, and for the treatment of diseases caused by micro-organisms.

---

This application is a continuation-in-part of application Ser. No. 640,835, filed May 24, 1967, now abandoned.

The present invention relates to antimicrobially active compounds and their preparation. In particular it concerns penicillins containing a quinolymethyl group or a substituted quinoylmethyl group in the side chain. These compounds (prepared according to the present invention) are of value as antibacterial agents, as nutritional supplements in animal feeds, as agents for treatment of mastitis in cattle and as therapeutic agents in poultry and animals, including man, in the treatment of infectious diseases caused by micro-organisms.

Accordingly, the present invention provides compounds of the general formula

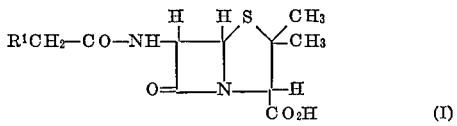

wherein $R^1$ is a quinolyl group which may be unsubstituted or substituted by one or more halogen atoms, alkyl or substituted alkyl, aryl, hydroxy, alkoxy, or acyloxy groups. In the above groups the alkyl and aryl radicals should not contain more than 6 and 10 carbon atoms, respectively.

Illustrations of $R^1$ containing the above constituents include:

potassium 3-quinolylmethylpenicillinate,
potassium 6-quinolylmethylpenicillinate,
potassium 6'-chloro-3-quinolylmethylpenicillinate,
potassium 4',6'-dichloro-3-quinolylmethylpenicillinate,
potassium 4'-chloro-3-quinolylmethylpenicillinate,
potassium 2'-chloro-4-quinolylmethylpenicillinate,
potassium 4'-chloro-7'-fluoro-3-quinolylmethylpenicilinanate,
potassium 4'-hydroxy-6'-chloro-3-quinolylmethylpenicillinate,
potassium 2'-methyl-4-quinolylmethylpenicillinate,
potassium 7'-trifluoromethyl-3-quinolylmethylpenicillinate,
potassium 2'-phenyl-4-quinolylmethylpenicillinate,
potassium 2'-hydroxy-4-quinolylmethylpenicillinate,
potassium 4'-methoxy-3-quinolylmethylpenicillinate,
potassium 4'-acetoxy-3-quinolylmethylpenicillinate,
potassium 2-quinolylmethylpenicillinate.

The present invention also comprises non-toxic salts of compounds with the Formula I. The salts include non-toxic metallic salts such as sodium, potassium, calcium and aluminum salts and substituted ammonium salts, e.g. salts of non-toxic amines as trialkylamines, including triethylamine, procaine, dibenzylamine, N-benzyl-β-phenethylamine, 1-epthenamine, N,N¹-dibenzylethylenediamine, dehydroabietylamine, N,N¹-bisdehydroabiethylenediamine, and other amines, which have been used to form salts with benzylpenicillin or phenoxymethylpenicillin.

The present invention further provides a process for preparing compounds of the general Formula I, which process comprises reacting a 6-aminopenicillanic acid compound of the formula

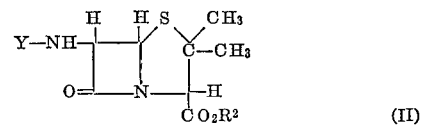

or a salt thereof, wherein $R^2$ represents a hydrogen atom, a trialkylsilyl or a phenacyl group which latter may be unsubstituted or substituted with one or more halogen atoms, lower alkyl groups, lower alkoxy groups or nitro groups or $R^2$ represents the group

in which $R^3$, $R^4$ and $R^5$ may be the same or different and each represents an alkyl group of at most 6 carbon atoms, and Y represents hydrogen or at the same time as $R^2$ a trialkylsilyl group, with an active ester, e.g. 2,4-di-nitrophenyl ester, p-nitrophenyl ester or N-hydroxysuccinimide ester, of the acid having the formula

$$R^1CH_2\text{—}COOH \qquad (III)$$

wherein $R^1$ has the same meaning as above, or with its functional equivalent as an acylating agent for a primary amino group. Such equivalents include the corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulphonic acids and of more hindered acids such as diphenylacetic acid. In addition, an acid azide or active thioester (e.g. with thiophenol, thioacetic acid), may be used or the free acid itself may be coupled with the 6-aminopenicillanic compound of Formula II by the use of a carbodiimide reagent. Another equivalent of the 2,4-dinitrophenyl and p-nitropenyl esters is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzothiazole and their substituted derivatives.

Still another equivalent is a derivative obtained by reaction between a carboxylic acid and N-ethyl-5-phenyl-isoxazolium-3'-sulphonate.

Starting materials of the Formula II are illustrated by the following compounds: 6-aminopenicillanic acid sodium salt, 6-aminopenicillanic acid potassium salt, 6-aminopenicillanic acid calcium salt, trimethylsilyl 6-aminopenicillinate, trimethylsilyl N-trimethylsilyl-6-aminopenicillinate and mixtures of these two compounds, triethylsilyl-6-aminopenicillinate, triethylsilyl N-triethylsilyl-6-aminopenicillinate and mixtures of these two compounds, phenacyl 6-aminopenicillinate, p-bromophenacyl 6-aminopenicillinate, p-chlorophenacyl 6-aminopenicillinate, phenacyl 6-aminopenicillinate benzenesulphonic acid salt, p-bromophenacyl 6-aminopenicillinate hydrochloride, tripropyltin 6-aminopenicillinate and tributyltin 6-aminopenicillinate.

Starting materials of the Formula III and the use of coupling reagents are illustrated by the following compounds: 3-quinolyl acetic acid bromide, 2-hydroxy-4-quinolyl acetic acid chloride, 6-quinolyl acetic acid 2,4-dinitrophenyl ester, 3-quinolyl acetic acid p-nitrophenyl ester, 2-methyl-4-quinolyl acetic acid N-hydroxysuccinimide ester, 3-quinolyl acetic acid anhydride, the mixed anhydride obtained from 3-quinolyl acetic acid and ethyl chloroformate, the mixed anhydride obtained from 3-quinolyl acetic acid and tertiary butyl chloroformate, 2-quinolyl acetic acid azide, the reaction product between 3-quinolyl acetic acid and dicyclohexylcarbodiimide, between 2-phenyl-4-quinolyl acetic acid and N-ethyl-5-phenylisoxazolium-3'-sulphonate and between 6-quinolyl acetic acid and N,N'-carbonyldiimidazole.

The compound of the general Formula II may be prepared according to British patent application No. 48,208/65 when $R^2$ is an unsubstituted or substituted phenacyl group and according to British patent application No. 1,694/66 when $R^2$ is the group —$SnR^3R^4R^5$.

In one embodiment of the present invention the penicillins are prepared by reacting the activated carboxylic acid derivative with 6-aminopenicillanic acid or a salt thereof in organic or aqueous medium.

In another and preferred embodiment of the invention an unsubstituted or halogen-substituted phenacyl ester or a trialkyltin ester of 6-aminopenicillanic acid or a salt thereof is reacted with a quinolylacetic acid in the presence of a coupling reagent, such as dicyclohexyl carbodiimide, N,N'-carbonyldiimidazole or N-ethyl-5-phenyl-isoxazolium-3'-sulphonate. The reaction is preferably carried out in an organic solvent such as tetrahydrofuran, dimethylformamide, acetonitrile, methylene chloride or mixtures thereof, at room temperature or below, preferably between —5 and +5° C. In order to obtain complete acylation of the 6-aminopenicillanic acid esters (II) an excess or the acylating agent may be used and the acylation product can be freed from excess of acylating agent by treatment with water at pH 7. After purification of the acylation product, the ester linkage may readily be cleaved by simple procedures without any appreciable destruction of the penicillin molecule taking place. Cleavage can be brought about by reaction with nucleophilic agents in non-aqueous solution e.g. sodium or potassium thiophenoxide in dimethylformamide. The tin ester group can also be removed by treatment with an aqueous acid or base under mild conditions of temperature at or below room temperature and a pH of between pH 1 and pH 10.

In cases where the compound of the general Formula III contains one or more asymmetric centra the resulting compound of the general Formula I may exist in different diastereoisomeric forms, which all are biologically active. It is to be understood that the present invention comprises the different diastereoisomers as well as mixtures of them.

The following examples illustrate the invention.

EXAMPLE 1

Potassium 3-quinolylmethylpenicillinate

A solution of dicyclohexylcarbodiimide (2.1 g.) in dimethylformamide (5 ml.) was added to a stirred ice cold mixture of 3-quinolylacetic acid (3.7 g.) and p-bromophenacyl 6-aminopenicillanate benzenesulphonic acid salt (5.7 g.) in dimethylformamide (20 ml.). After stirring at 4° C. for 15–20 hours ethyl acetate (50 ml) was added and the dicyclohexylurea formed (about 2.2 g.) was removed by filtration. The filtrate was washed with sodium bicarbonate solution and water. After drying and evaporating the solvent the residue (4.7 g.) was dissolved in dimethylformamide (10 ml.) and potassiumthiophenolate (1.05 g.) dissolved in dimethylformamide (5 ml.) was added. After 30 min. acetone (100 ml.) was added and the potassium salt of 3-quinolylmethylpenicillin, which precipitated, was collected by filtration and washed with acetone. Yield 2 g. (53%), purity 80% (hydroxylamine assay). The compound had a strong IR absorption band at 1780 cm.$^{-1}$ and inhibited the growth of *Staphylococcus aureus* Oxford at a concentration of 0.01 mcg./ml.

EXAMPLE 2

Potassium 6-quinolylmethylpenicillinate was prepared as described in Example 1 from 6-quinolylacetic acid (3.7 g.), p-bromophenacyl 6-aminopenicillinate benzenesulphonic acid salt (5.7 g.) and dicyclohexylcarbodiimide (2.1 g.). Yield 1.8 g. (48%), purity 55% (hydroxylamine assay). The compound had a strong IR absorption band at 1785 cm.$^{-1}$ and inhibited the growth of *Staph. aureus* Oxford at a concentration of 0.03 mcg./ml.

EXAMPLE 3

Potassium 3-quinolylmethylpenicillinate 3-quinoline acetic acid (2.8 g.) was added to an ice cold stirred solution of tributyltin 6-aminopenicillinate (5.1 g.) in tetrahydrofuran (20 ml.) and immediately thereafter an ice cold solution of dicyclohexylcarbodiimide (2.1 g.) in tetrahydrofuran (5 ml.) was added. After stirring at 0.4° C. for 15 hours ethyl acetate (50 ml.) was added, the dicyclohexylurea formed (2.2 g.) was removed by filtration and the pH was adjusted to 6.8. The organic phase was dried and concentrated in vacuo to yield an oily residue (6.6 g.) which was dissolved in dimethylformamide (15 ml.) and treated with potassium thiophenolate (1.48 g.) in dimethylformamide (5 ml.) for 45 min. at 25° C.

After working up as described in Example 1 the potassium salt of the penicillin (2.2 g. 58%) was obtained in a purity of 83% (hydroxylamine assay).

EXAMPLE 4

Potassium 6-quinolylmethylpenicillinate was prepared as described in Example 3 from 6-quinolylacetic acid (2.8 g.), tributyltin 6-aminopenicillinate (5.1 g.) and dicyclohexylcarbodiimide (2.1 g.). Yield 1.9 g. (50%), purity 85% (hydroxylamine assay).

In the same way the following compounds were also prepared:

| Compound | IR absorption, cm.$^{-1}$ | Purity, percent | Minimum inhibitory concentration (Staph. aureus, Oxford), μg./ml. |
| --- | --- | --- | --- |
| Potassium 7'-trifluoromethyl-3-quinolylmethyl-penicillinate | 1,760 | 80 | 0.03 |
| Potassium 6'-chloro-3-quinolyl-methyl-penicillinate | 1,750 | 57 | 0.03 |
| Potassium 4',6'-dichloro-3-quinolylmethyl-penicillinate | 1,755 | 81 | 0.03 |
| Potassium 4'-chloro-3-quinolylmethyl-penicillinate | 1,750 | 76 | 0.06 |
| Potassium 4'-hydroxy-6'-chloro-3-quinolylmethyl-penicillinate | 1,760 | 47 | 0.63 |
| Potassium 2'-chloro-4-quinolylmethyl-pencillinate | 1,760 | 85 | 0.06 |
| Potassium 2'-hydroxy-4-quinolylmethyl-penicillinate | 1,760 | 55 | 0.13 |

EXAMPLE 5

Potassium 3-quinolylmethylpenicillinate

N-ethyl-5-phenylisoxazolium - 3' - sulphonate (1.27 g.) was added to a stirred solution of 3-quinolyl acetic acid (0.93 g.) and triethylamine (0.7 ml.) in nitromethane (20 ml.) and then tributyltin 6-aminopenicillinate (2.4 g.) was added. After 15 hours at +4° C. chloroform (20 ml.) was added and the organic phase washed with water (20 ml.) and dried. After evaporating the solvent in vacuo dimethylformamide (3 ml.) and potassium thiophenoxide (0.7 g.) dissolved in dimethylformamide (3 ml.) was added. After 45 min. the mixture was poured into ether (100 ml.) The potassium salt of 3-quinolylmethylpenicillin, which precipitated, was collected by filtration and washed with ether. Yield 1.5 g., purity 49%.

EXAMPLE 6

Potassium 3-quinolylmethylpenicillinate

Dioxan (40 ml.) was added to a stirred, ice cooled mixture of 6-aminopenicillanic acid (1.08 g.) and sodium bicarbonate (0.42 g.) in water (25 ml.) and the stirring was continued for 60 min. at +4° C. Dicyclohexylcarbodiimide (1.03 g.) dissolved in dioxan (10 ml.) was then added and after 1 min. 3-quinolyl acetic acid (0.93 g.) dissolved in water (5 ml.) was added. After stirring for 15 hours at +4° C. the mixture was filtered and the filtrate freeze dried, leaving the potassium salt of 3-quinolylmethylpenicillin. Yield 1.85 g., purity 39%.

EXAMPLE 7

Potassium 2-quinolylmethylpenicillinate

To a solution of 2-quinolylacetic acid hydrazide (4.02 g.) in 2 N hydrochloric acid (20 ml.), water (25 ml.) and dioxan (25 ml.) kept at −10° C. a solution of sodium nitrite (1.4 g.) in water (5 ml.) was added dropwise. After addition of the sodium nitrite tributyltin 6-aminopenicillinate (5.05 g.) in tetrahydrofuran (20 ml.) was added all at once to the diazotation mixture. The temperature was allowed to rise to 0.5° C. and the pH adjusted to 6.5 with 2 N sodium hydroxide. After 1 hour the mixture was extracted with ethyl acetate (100 ml.). The organic phase after drying and evaporating left a residue of 3.8 g. The residue dissolved in dimethylformamide (5 ml.) was located with potassium thiophenoxide (0.8 g.) for ½ hour, after which time the mixture was poured on ether (150 ml.). The precipitated product was collected by filtration and washed with ether. (Purity 30%, IR absorption 1760 cm.$^{-1}$.)

We claim:
1. A compound selected from the group consisting of compounds of the general formula

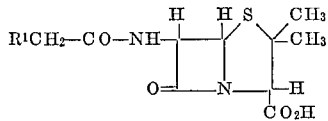

and non-toxic salts thereof, wherein $R^1$ is a quinolyl group which may be unsubstituted or substituted by at least one substituent selected from the group consisting of chloride, fluoride, methyl, trifluoromethyl, phenyl, hydroxy, methoxy and acetoxy radicals.

2. A compound according to claim 1 wherein $R^1$ is an unsubstituted quinolyl radical.

3. A compound according to claim 1 wherein $R^1$ is a quinolyl group substituted by at least one substituent selected from the group consisting of chloride and hydroxy radicals.

4. A compound selected from the group consisting of 3-quinolylmethylpenicillin and its non-toxic salts.

5. A compound selected from the group consisting of 6-quinolylmethylpenicillin and its non-toxic salts.

6. A compound selected from the group consisting of 7′-trifluoromethyl-3-quinolylmethylpenicillin and its non-toxic salts.

7. A compound selected from the group consisting of 6′-chloro - 3 - quinolylmethylpenicillin and its non-toxic salts.

8. A compound selected from the group consisting of 4′,6′-dichloro-3-quinolylmethylpenicillin and its nontoxic salts.

References Cited

UNITED STATES PATENTS 3,174,964  3/1965  Hobbs et al. _____ 260—239.1
3,352,850  11/1967 Doyle et al. _____ 260—239.1

NICHOLAS S. RIZZO, Primary Examiner

U.S. Cl. X.R.

260—999

PO-1050
(5/69)

UNITED STATES PATENT OFFICE
CERTIFICATE OF CORRECTION

Patent No. 3,531,469          Dated September 29, 1970

Inventor(s) Peter Bamberg et al.

It is certified that error appears in the above-identified patent and that said Letters Patent are hereby corrected as shown below:

Column 1, line 58, "linanate" should be -- linate --;
Column 2, line 48, "p-nitropenyl" should be
-- p-nitrophenyl --; line 52, "benzothiazole should
be -- benzotriazole --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents